United States Patent [19]

Lo

[11] Patent Number: 5,624,059
[45] Date of Patent: Apr. 29, 1997

[54] DEVICE FOR DISPENSING CORROSIVE LIQUIDS ACCURATELY AND WITHOUT CONTAMINATION

[75] Inventor: Timothy Y. T. Lo, Victoria, Canada

[73] Assignee: Axys Environmental Systems Ltd., Canada

[21] Appl. No.: 417,760

[22] Filed: Apr. 5, 1995

[51] Int. Cl.⁶ .................................................. B65D 88/54
[52] U.S. Cl. .................. 222/309; 222/324; 222/383.1; 422/100
[58] Field of Search ................... 222/324, 383.1, 222/309, 378, 507; 422/100

[56] References Cited

U.S. PATENT DOCUMENTS

| | | |
|---|---|---|
| 553,726 | 1/1896 | True . |
| 1,681,845 | 8/1928 | Dilley et al. . |
| 1,823,654 | 9/1931 | Hast . |
| 1,929,564 | 10/1933 | Rolph ........................................ 225/22 |
| 2,197,143 | 4/1940 | Cannon et al. ........................... 225/31 |
| 2,643,800 | 6/1953 | Todd et al. ............................. 222/400.7 |
| 3,207,387 | 9/1965 | Brickman ............................... 222/400.8 |
| 3,283,727 | 11/1966 | Rodrigues, Jr. ....................... 222/309 X |
| 4,063,667 | 12/1977 | Flider ....................................... 222/470 |
| 4,306,670 | 12/1981 | Oshikubo ........................... 222/383.1 X |
| 4,526,294 | 7/1985 | Hirschmann et al. ................ 222/309 X |
| 4,565,302 | 1/1986 | Pfeiffer et al. ............................ 222/38 |
| 4,995,532 | 2/1991 | Knodel .................................. 222/309 X |

*Primary Examiner*—Gregory L. Huson
*Attorney, Agent, or Firm*—Fetherstonhaugh & Co.

[57] ABSTRACT

A device for dispensing corrosive liquids accurately and without spilling can be held in one hand while the other hand holds a vessel into which liquid is dispensed. The device has a tubular barrel with a thumb stop at a top end and a cap at a bottom end for connection to a liquid container. A hand grip fits over the barrel and is slidable thereon with a connection link to a plunger slidable within a cavity in the barrel. A liquid intake tube extends down from the base of the cavity in the barrel, through the cap, into the liquid container and has a first non-return valve therein, such that sliding movement of the hand grip upwards on the barrel draws liquid through the intake tube into the cavity, and a liquid dispensing tube connected to the cavity, with a second non-return valve therein, such that sliding movement of the hand grip downwards on the barrel dispenses liquid from the cavity through the dispensing tube.

11 Claims, 2 Drawing Sheets

5,624,059

DEVICE FOR DISPENSING CORROSIVE LIQUIDS ACCURATELY AND WITHOUT CONTAMINATION

TECHNICAL FIELD

The present application relates to a device for dispensing liquids such as corrosive liquids accurately and without spilling. More specifically, the invention relates to a device that can be held in one hand and safely dispense a controlled amount of liquid into a container held in the other hand.

BACKGROUND ART

Dispensing of hazardous liquids such as acids and other corrosive liquids must be achieved carefully to avoid spillage of liquid and to avoid the user of a dispenser having liquid contact the user's skin. Pouring liquids from a container such as a bottle can result in drips, either dropping beside the bottle or running down the outside surface. If this happens, then the liquid can contact the skin of a user. Thus, it is always necessary to clean up after any corrosive liquid has been dispensed to ensure no drops are left on or around the container.

It is also a requirement to be able to dispense a predetermined quantity of liquid accurately from one container to another vessel without contamination of the dispensed liquid. There are a number of dispensing devices available today, however, it is most important that there is no flow back of the liquid once it has been withdrawn from a container, otherwise this can cause contamination in the supply container.

Rolph in U.S. Pat. No. 1,929,564 discloses a manual pump for delivering measured quantities of liquid, as does Pfeiffer et al in U.S. Pat. No. 4,565,302. However, neither of these patents address the problem of preventing contamination.

It is an object of the present invention to provide a device for withdrawing a precise amount of liquid from a supply container and transferring this precise amount to another vessel without contamination of the dispensed liquid or the remainder of the liquid in the container. Another object of the invention is to maintain the safety of the operator by lessening the chances of minor drips or major spills of hazardous liquids occurring. A still further object of the invention is to perform all of the required actions with only one hand in order to leave the other hand free and without moving the liquid container.

DISCLOSURE OF THE INVENTION

The present invention provides a liquid dispensing device for use in association with a liquid container comprising: a tubular barrel having a thumb stop at a top end and a cap at a bottom end for connection to the liquid container, the barrel having a cavity therein; a hand grip fitting over the barrel, slidable thereon, having a connection link to a plunger slidable within the cavity in the barrel; a liquid intake tube extending down from the base of the cavity in the barrel, through the cap, into the liquid container with a first non-return valve therein, such that sliding movement of the hand grip upwards on the barrel draws liquid through the intake tube into the cavity, and a liquid dispensing tube connected to the cavity with a second non-return valve therein, such that sliding movement of the hand grip downwards on the barrel dispenses liquid from the cavity through the dispensing tube.

BRIEF DESCRIPTION OF THE DRAWINGS

In drawings which illustrate embodiments of the present invention.

BEST MODE FOR CARRYING OUT THE INVENTION

Figure 1:
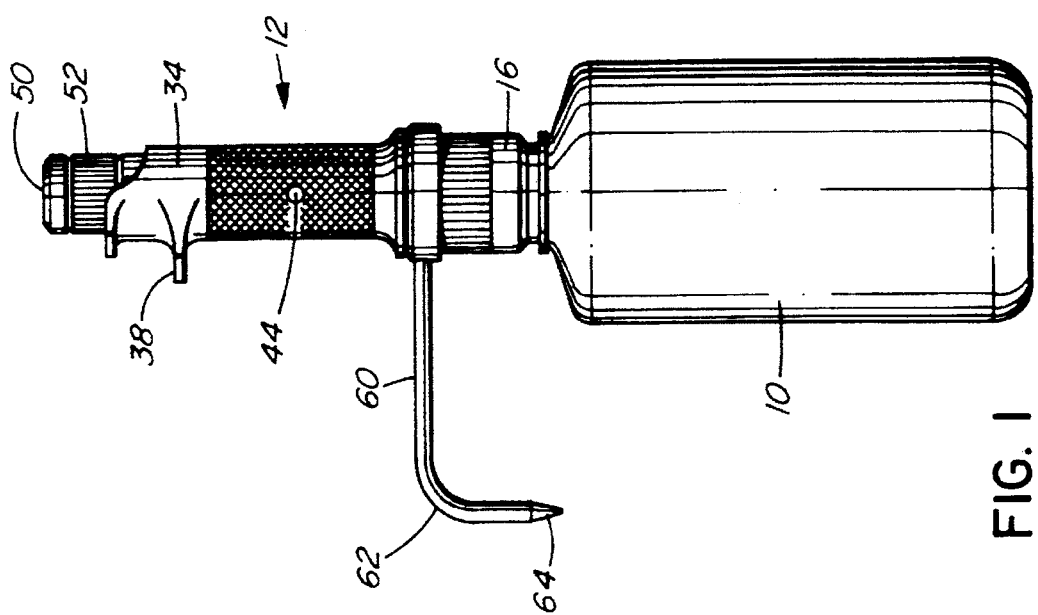
FIG. 1 is a side elevational view showing a liquid dispensing device according to one embodiment of the present invention attached to a liquid container.

Referring now to the drawings, a liquid container 10 is shown in FIG. 1 with a dispensing device 12 attached thereto. Details of the dispensing device 12 are illustrated more clearly in FIGS. 2 and 3. The dispensing device 12 has a main tubular barrel 14 which at its base has a cap 16 rotatable relative to the barrel 14 and having an internal screw thread 18 for engaging screw threads on the neck of the liquid container 10. A seal 20 is provided at the top of the cap 16 to ensure liquid does not escape should the container 10 fall over.

Figure 2:
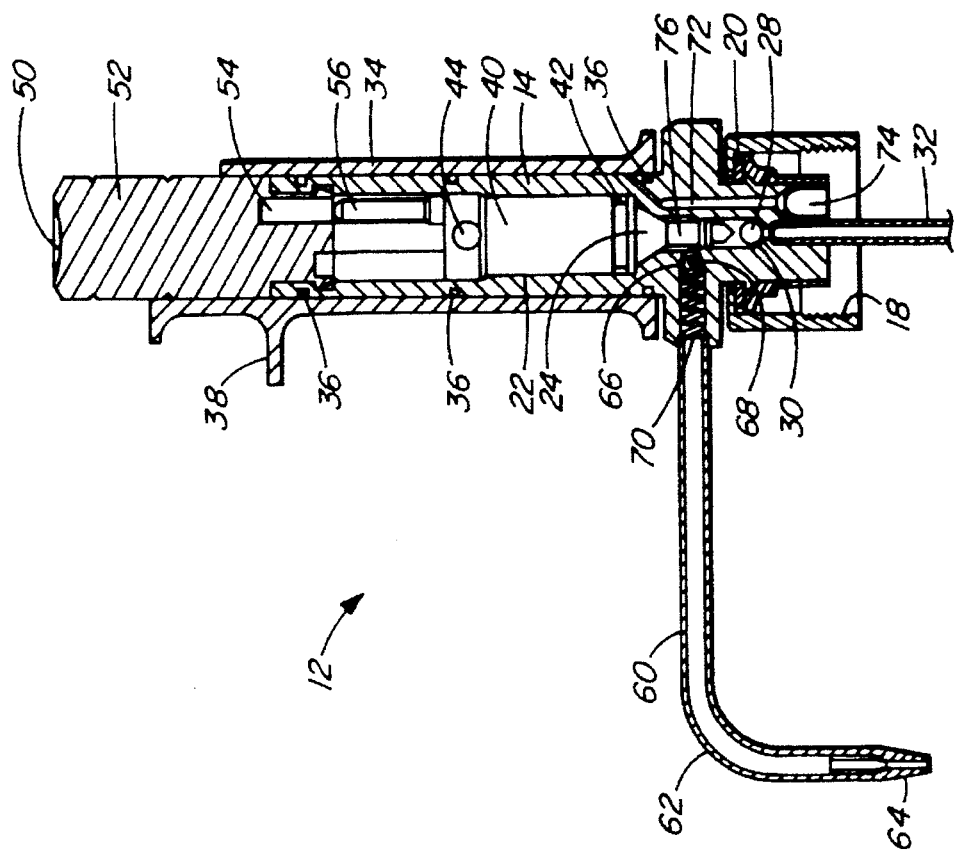
FIG. 2 is a sectional elevational view showing the liquid dispensing device of FIG. 1.

As shown in FIG. 2, the barrel 14 has a cylindrical cavity 22 therein with a tapered portion 24 extending down to a first non-return valve 26 comprising a ball 28 resting on seat 30. A liquid intake tube 32 extends from below seat 30 into the liquid container 10 to draw liquid into the cavity 22.

A hand grip 34 fits over the barrel 14 and slides up and down on the barrel 14 with a number of O-rings 36 to provide a seal between the hand grip 34 and the barrel 14. The hand grip 34 is fashioned to provide a secure grip by projections 38 that fit between the fingers of the operator's hand. A plunger 40 within the cavity 22 has an O-ring seal 42 at the base and moves up and down in the cavity 22. At the top of the plunger 40 is a lock pin 44, as illustrated more clearly in FIG. 3, which passes through hole 46 in the hand grip 34, through vertical slots 48 in the barrel 14 and connects to the plunger 40. Thus, movement of the hand grip 34 up and down on the barrel 14 moves the plunger 40 up and down in the cavity 22.

Figure 3:
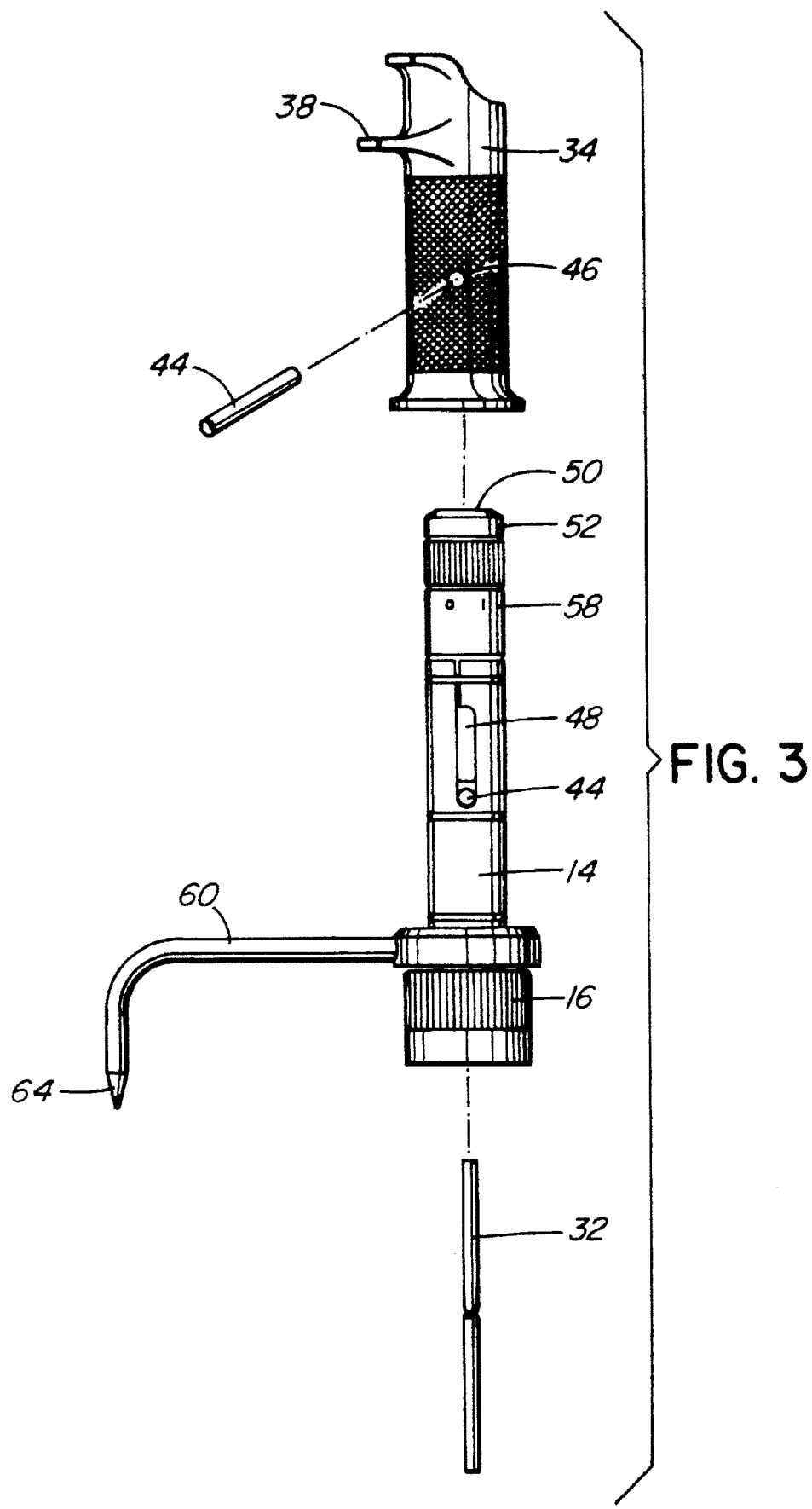
FIG. 3 is an exploded view showing components of the liquid dispensing device of FIG. 1.

On top of the barrel 14 is a thumb stop 50. The top portion 52, with the thumb stop 50 on top, is rotatable on the barrel 14 and has underneath a series of holes 54 of different depths. These holes 54 are concentric with a rotational axis of the top portion 52. Mounted on the top of the plunger 40 is a stop pin 56 which protrudes up into one of the holes 54. As shown in FIG. 3, the top portion 52 has a dial 58 with numbers representing positions of the holes 54 above the pin 56. The depth of the holes are such that the plunger 40 is raised a predetermined amount, as far as the pin can advance into the hole 54, which constitutes a predetermined volume, thus the dispensing volume can be controlled by varying the depth of the hole 54 that the pin 56 projects into.

At the bottom of the cavity 22 a dispensing tube 60 extends out substantially horizontally to an elbow 62, terminating at a nozzle 64. The length of the dispensing tube 60 is dependent upon the size of the liquid container 10. It is important that it extends beyond the container so that a further vessel or container can be placed under the nozzle 64 for filling. A second non-return valve 66 in the form of a poppet seals on a shoulder 68 and has a spring 70 to force the poppet closed.

A vent 72 is shown extending up inside the cap 16 exiting at a position inside the hand grip 34 in the low position so that venting only occurs from the container 10 when the hand grip 34 is raised. Thus, when the hand grip 34 is in the lowered position, the container 10 is sealed.

In operation the hand grip 34 is grasped in one hand with the thumb resting on the thumb stop 50. Initially, the hand grip 34 is in the lowered position, thus, there is no vent 72 open from the container 10. By squeezing the hand grip 34 and pushing the thumb downward on the thumb stop 50, the hand grip 34 in effect rises on the barrel 14, the plunger 40 rises in the cavity 22, and this causes liquid to be pulled up into the cavity 22 through the liquid intake tube 32. The distance that the plunger 40 can move is dependent upon which of the holes 54 is positioned over the stop pin 56.

As the liquid enters the cavity 22, the ball 28 of the first non-return valve 26 is raised to allow the liquid therein. When the hand grip 34 has reached its top position, that is to say, the position that it is able to go due to the combination of the stop pin 56 and the hole 54, then it is held in that position. Liquid cannot drop back into the container 10 because the ball 28 of the first non-return valve 26 seals against the shoulder 30. During this time the second non-return valve 66 is closed because the spring 70 is pushing the poppet 66 against the shoulder 68. The container 10 with the dispenser 12 attached thereto can then be moved if desired by one hand. Alternatively, the other hand of the operator can pick up a vessel and place it under the nozzle 64. The operator then releases the thumb from the thumb stop 50, lowers the hand grip 34 on the barrel 14 which causes the liquid in the cavity 22 to push against the poppet 66 and open the second non-return valve 66, thus forcing the liquid to flow through the discharge tube 60 and out through the nozzle 64. When the hand grip 34 is in the lowered position, there is no more pressure applied to the second return valve 66, therefore, no more liquid can be dispensed and drips do not occur from the nozzle 64.

Every time dispensing is required it is simply necessary to grip the hand grip 34, push down with the operator's thumb on the thump stop 50 to raise the hand grip 34 and this fills the cavity 22, then release the thumb from the thumb stop 50, lower the hand grip 34 on the barrel 14 and the liquid is dispensed from the cavity 22 through the nozzle 64. Changes to the quantity to be dispensed may be made by rotating the upper portion 52 using the dial 58 where different numbers signifies different volumes to be dispensed. Furthermore, as the hand grip 34 is raised from the lowered position, the vent 72 is opened permitting air to enter the liquid container 10 so there is no drop in pressure within the container. In one embodiment a filter 74 is provided in the vent 72 so that the air is filtered as it enters the container 10. When the hand grip 34 is lowered on the barrel 14 to the lowered position, then the vent 72 is sealed. This prevents contamination or spillage if the container should be upset.

The plunger 40 has a sealing pin 76 at its base and when the plunger 40 is at the bottom of its stroke the sealing pin 76 blocks the feed tube from the first non-return valve 26 and the intake tube 32. Furthermore, the second non-return valve 66 is closed, thus, if the dispensing device were to tip over, liquid would not spill.

The dispensing device 12 is made from materials of non-contaminating material, particularly those surfaces that are in contact with the liquid.

The dispensing device 12 does not require the container itself to be moved when dispensing a liquid. In fact the movement of the hand grip 34, which is up and down on the barrel 12, does not even require any shaking of the container 10. Furthermore, when dispensing is finished and the hand grip is lowered to the lowered position, the discharge tube, inlet tube and the vent are all sealed, therefore no syphoning action occurs.

Various changes may be made to the embodiments shown herein without departing from the scope of the present invention which is limited only by the following claims.

The embodiments of the present invention in which an exclusive property or privilege is claimed are defined as follows:

1. A liquid dispensing device for use in association with a liquid container comprising:
    a tubular barrel having a thumb stop at a top end and a cap at a bottom end for connection to the liquid container, the barrel having a cavity therein;
    a hand grip fitting over the barrel slidable thereon, having a connection link to a plunger slidable within the cavity in the barrel;
    a liquid intake tube extending down from the base of the cavity in the barrel, through the cap, into the liquid container with a first non-return valve therein such that sliding movement of the hand grip upwards on the barrel draws liquid through the intake tube into the cavity, and
    a liquid dispensing tube connected to the cavity with a second non-return valve therein, such that sliding movement of the hand grip downwards on the barrel dispenses liquid from the cavity through the dispensing tube.

2. The liquid dispensing device according to claim 1 wherein the connection link between the hand grip and the plunger comprises a lock pin passing through both the hand grip and the plunger, the lock pin also passing through slots in the barrel to permit slidable movement of the plunger in the cavity.

3. The liquid dispensing device according to claim 2 including a volume control means to restrict movement of the plunger in the cavity to different distances to provide different volumes of liquid dispensed.

4. The liquid dispensing device according to claim 3 wherein the volume control means comprises a stop pin that fits into a plurality of different depth holes in a top portion of the barrel above the cavity, the top portion being rotatable to select one of the different depth holes for the stop pin.

5. The liquid dispensing device according to claim 1 wherein the liquid container is a plastic bottle container and the cap has a screw thread and seal to attach the barrel to the liquid container.

6. The liquid dispensing device according to claim 1 wherein O-ring seals are provided between the barrel and the hand grip to prevent leakage of liquid.

7. The liquid dispensing device according to claim 1 wherein at least one O-ring seal is provided between the plunger and the cavity to prevent leakage of liquid when filling the cavity and dispensing from the cavity.

8. The liquid dispensing device according to claim 1 wherein the first non-return valve comprises a ball that seals on a shoulder to prevent liquid passing back through the intake tube.

9. The liquid dispensing device according to claim 1 wherein the second non-return valve is a spring loaded poppet valve that is opened under pressure when liquid from the cavity is dispensed through the dispensing tube.

10. The liquid dispensing device according to claim 1 including a vent aperture through the cap to vent the liquid container, the vent aperture being sealed when the hand grip is in the lowest position.

11. The liquid dispensing device according to claim 1 wherein the liquid dispensing tube extends substantially horizontally out from the barrel below the hand grip, and has an elbow with a dispensing nozzle at the end thereof.

* * * * *